United States Patent
Brennan et al.

(10) Patent No.: US 6,735,295 B1
(45) Date of Patent: May 11, 2004

(54) CALL WAITING MESSAGING (75) Inventors: Paul M. Brennan, Toronto (CA); John C. Myers, Toronto (CA); Robert A. Williamson, Aurora (CA); Anne Grosman, Willowdale (CA); Pieter Groen, Toronto (CA)

(73) Assignee: Nortel Networks Limited, St. Laurent (CA)

(*) Notice: Subject to any disclaimer, the term of this patent is extended or adjusted under 35 U.S.C. 154(b) by 402 days.

(21) Appl. No.: 09/604,659

(22) Filed: Jun. 27, 2000

(51) Int. Cl.[7] .............................................. H04M 3/42
(52) U.S. Cl. .......................... 379/215.01; 379/88.13; 379/88.23
(58) Field of Search ....................... 379/88.13, 215.01, 379/88.23

(56) References Cited

U.S. PATENT DOCUMENTS

| 5,034,947 A | 7/1991 | Epps ........................... 370/268 |
| 5,329,578 A | 7/1994 | Brennan et al. ............... 379/67 |
| 5,652,789 A | 7/1997 | Miner et al. ................. 379/201 |
| 5,825,867 A | 10/1998 | Epler et al. ............. 379/215.01 |
| 5,835,573 A | 11/1998 | Dee et al. ................. 379/88.26 |
| 5,894,504 A * | 4/1999 | Alfred et al. ............. 379/88.13 |
| 5,905,774 A | 5/1999 | Tatchell et al. ........... 379/88.04 |
| 6,026,156 A | 2/2000 | Epler et al. ............. 379/215.01 |
| 6,343,121 B1 * | 1/2002 | Infosino ................. 379/215.01 |
| 6,438,216 B1 * | 8/2002 | Aktas ....................... 379/88.01 |
| 6,498,841 B2 * | 12/2002 | Bull et al. ............. 379/142.08 |

FOREIGN PATENT DOCUMENTS

| FI | WO 98/48607 | 11/1998 |
| WO | WO 98/53617 | 11/1998 |
| WO | WO 99/48263 | 9/1999 |

* cited by examiner

Primary Examiner—Ahmad F. Matar
Assistant Examiner—Karen Le (57) ABSTRACT

When a caller calls a call busy called station, the caller may request that a message be provided to the called station while the caller waits. In such instance, the called station receives the message while busy with the other call. The message may be speech indications provided by the caller which are received by the called station at a volume normally associated with a whisper. The speech indications may be recorded from the caller and the caller given an opportunity to edit same before they are sent. The message may also be a text message where the called station supports text or has an associated text-based telephone appliance.

18 Claims, 6 Drawing Sheets

CALL WAITING MESSAGING

BACKGROUND OF THE INVENTION

This invention relates to an apparatus and method for handling call waiting.

While a person is busy with a voice call, it may happen that another call is made to that person. In such a circumstance, it is known to provide call waiting tones on the communication line to alert the person of the other call. The person can then (with a flash hook indication) take the new call. A drawback with this approach is that the caller cannot communicate the importance of her call.

WO99/48263 filed by Ameritech Corporation and published Sep. 23, 1999 describes an advanced intelligent network (AIN) where, when a service switching point (SSP) determines a called station is busy, it queries a service control point (SCP) in respect of the call. In one embodiment, the SCP returns call control information which directs the SSP to generate instructions that ask the calling party to speak her name. The spoken name can be recorded. Additionally, the caller may be able to key in an indication of call priority. The call path of the previous call can then be interrupted to place it on hold and then call waiting indicators and an audible representation of the caller's name along with a priority indication can be provided to the called station.

This approach provides the caller with a limited ability to communicate the importance of her call.

In U.S. Pat. No. 5,894,504 to Alfred, where a call comes in for a call busy line, if the called party subscribes to call waiting and voice messaging, call waiting tones are applied to the busy line and the caller is passed to voice mail. The called party, on hearing the call waiting tones, has the option of keying in a code which sets up a one-way conference call allowing the called party to eavesdrop on the message.

This allows the called party to make a more informed decision as to whether to take the call but, as the entire process is transparent to the caller, the ability of the caller to properly communicate the importance of her call is limited.

Accordingly, there is a need for an improved approach to provide a called party with call waiting information.

SUMMARY OF INVENTION

When a caller calls a call busy called station, the caller may request that a message be provided to the called station while the caller waits. In such instance, the called station receives the message while busy with the other call. The message may be speech indications provided by the caller which may be recorded and edited by the caller before being delivered.

Accordingly, the present invention provides a method for voice call management comprising, where a communications link terminated by a first station is busy with a call and a new call is waiting for said first station, responsive to a request from a calling station for said new call, providing a message on said call busy communications link based on input from said calling station, said message comprising speech indications superimposed on a path of said communications link outbound to said first station and not superimposed on a path of said communications link inbound from said first station.

An apparatus, a personal agent, a voice mail system, and a telephone switch adapted to carry out this method are also provided. Additionally, a computer readable medium is provided which adapts a communications system to carry out the method. Further a computer data signal is provided which adapts a communication system to carry out the method.

According to another aspect of the present invention, there is provided a method for facilitating voice call management, comprising: while a call path is busy with a call, on receipt of another call for said call path from a calling station: on said calling station requesting messaging on said call path while said call path is busy, prompting said calling station for information and superimposing speech indications on said call path based on any said information.

According to a further aspect of the present invention, there is provided a method for facilitating voice call management, comprising: while a called party station is busy with a call on a communications link, on request of a calling station for a waiting call, providing speech indications to said called party station on said communications link relating to said waiting call at a volume normally associated with a whisper.

According to yet a further aspect of the present invention, there is provided a method for facilitating voice call management, comprising: while a call path terminated with a first station is busy with a call, on receipt of another call for said first station from a calling station and on receipt of an indication from said calling station, superimposing on any signal on a path of said call path outbound to said first station, speech indications related to said another call at a volume normally associated with a whisper.

According to another aspect of the present invention, there is provided a method for voice call management comprising, where a communications link is busy with a call and a new call is waiting, providing a message on said call busy communications link based on initial input from a calling station for said new call and editing input from said calling station.

Other aspects and features of the present invention will become apparent to those ordinarily skilled in the art upon review of the following description of specific embodiments of the invention in conjunction with accompanying figures.

BRIEF DESCRIPTION OF THE DRAWINGS

In the figures which illustrate example embodiments of the invention.

DETAILED DESCRIPTION OF THE PREFERRED EMBODIMENTS

Figure 1:
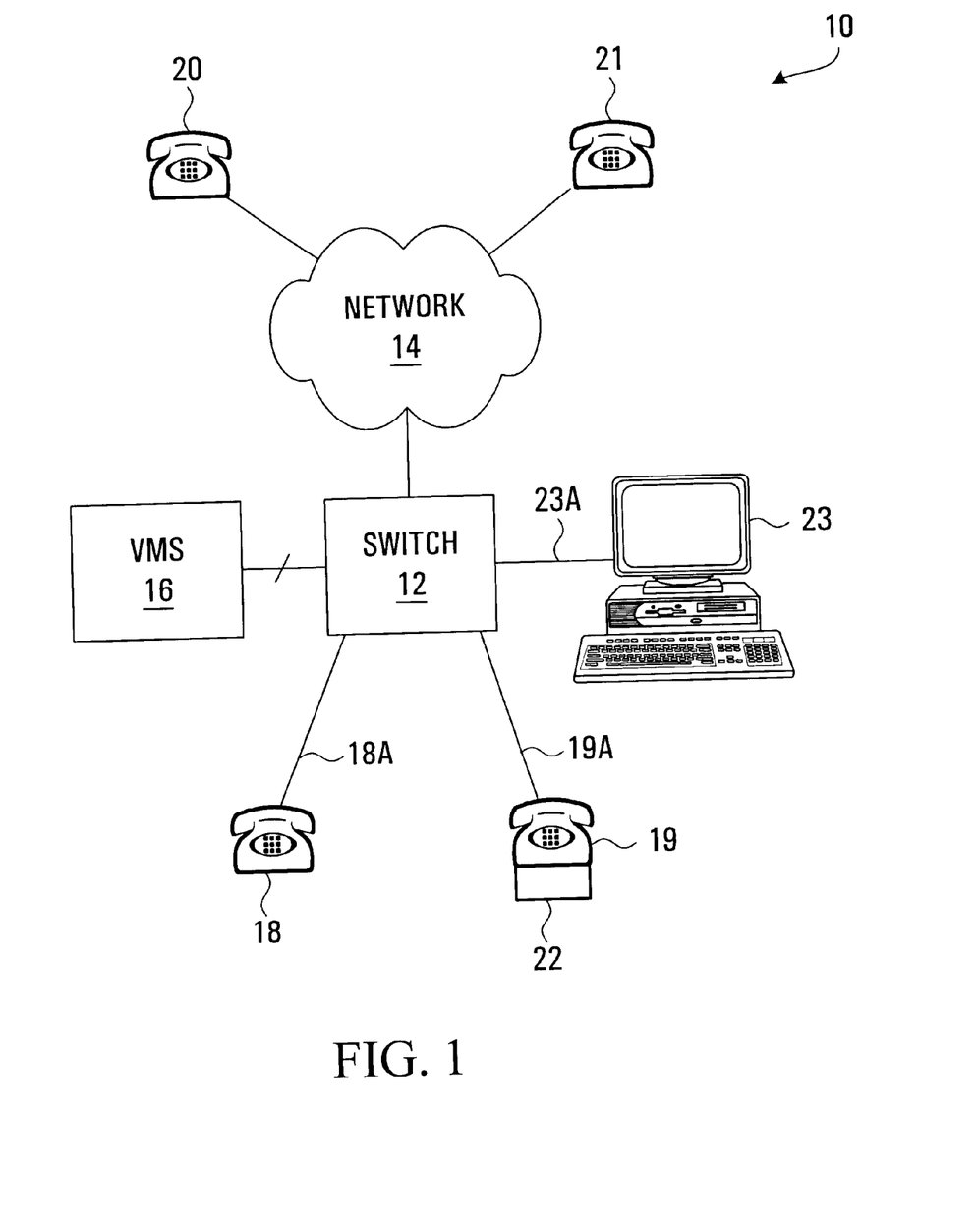
FIG. 1 is a schematic diagram of a system made in accordance with this invention.

Turning to FIG. 1, a communications system 10 comprises a switch 12 connected to a network 14. Network 14 may be a public switched telephone network (PSTN), the Internet, or both a PSTN and Internet. The switch 12 is also connected to a voice mail system (VMS) 16 and a number of communication lines 18a, 19a which are terminated by telephone stations 18, 19, respectively. Telephone station 19 may have a display 22. Other telephone stations 20, 21 may also be associated with the network 14. Where network 14 is or includes the Internet, switch 12 may also be connected on communication line 23*a* to a telephone station which is implemented on a computer 23.

Figure 2:
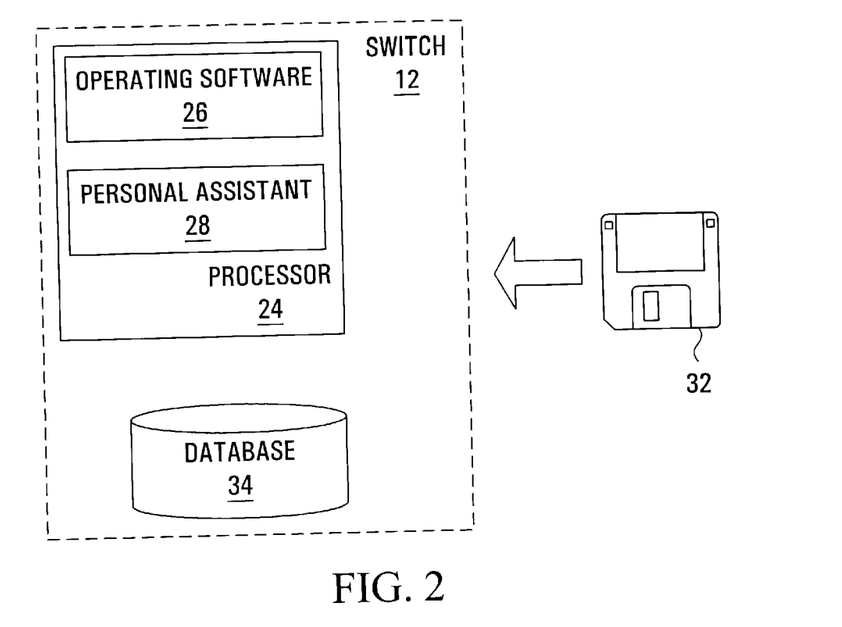
FIG. 2 is a block diagram of a portion of FIG. 1.
Figure 3:
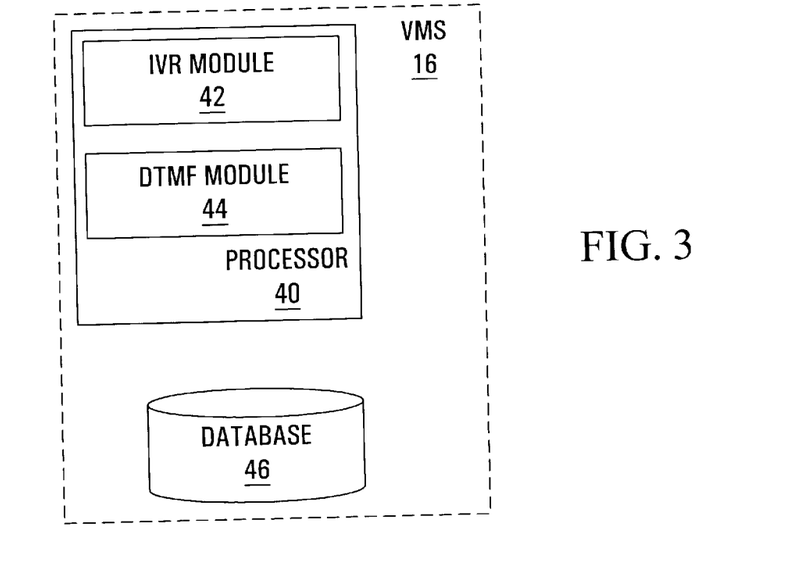
FIG. 3 is a block diagram of another portion of FIG. 1, FIGS. 4A, 4B, and 5 are flow diagrams illustrating the operation of portions of FIG. 1.

Referencing FIG. 2, the switch 12 has a processor 24 with operating software 26 and a personal agent 28 each of which may be a software module loaded into the switch from a computer readable media 32. The computer readable media may be, for example, a disk, a tape, a removable memory chip, or a file downloaded from a remote source. The switch additionally has a database 34.

Figure 4A:
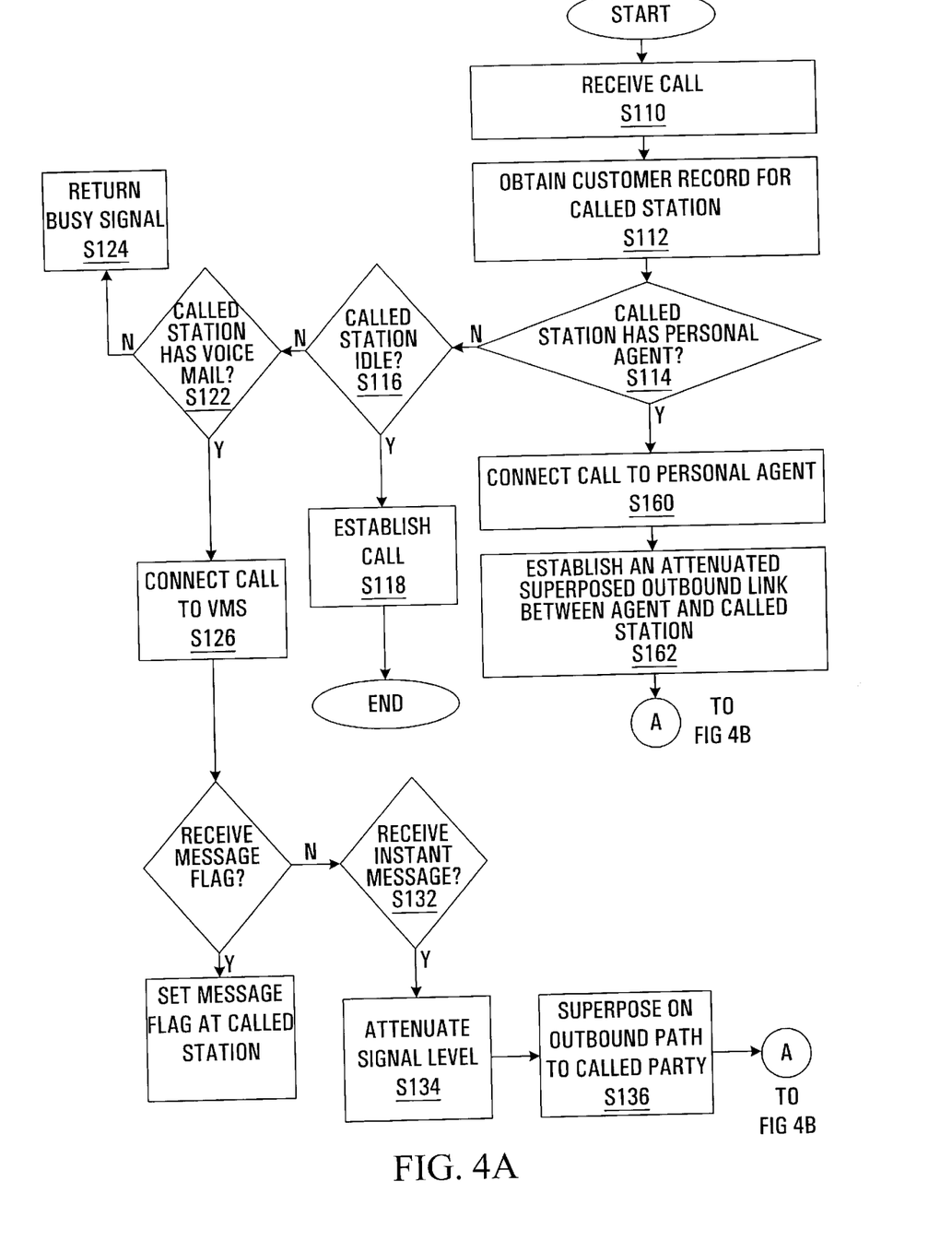
Figure 4B:
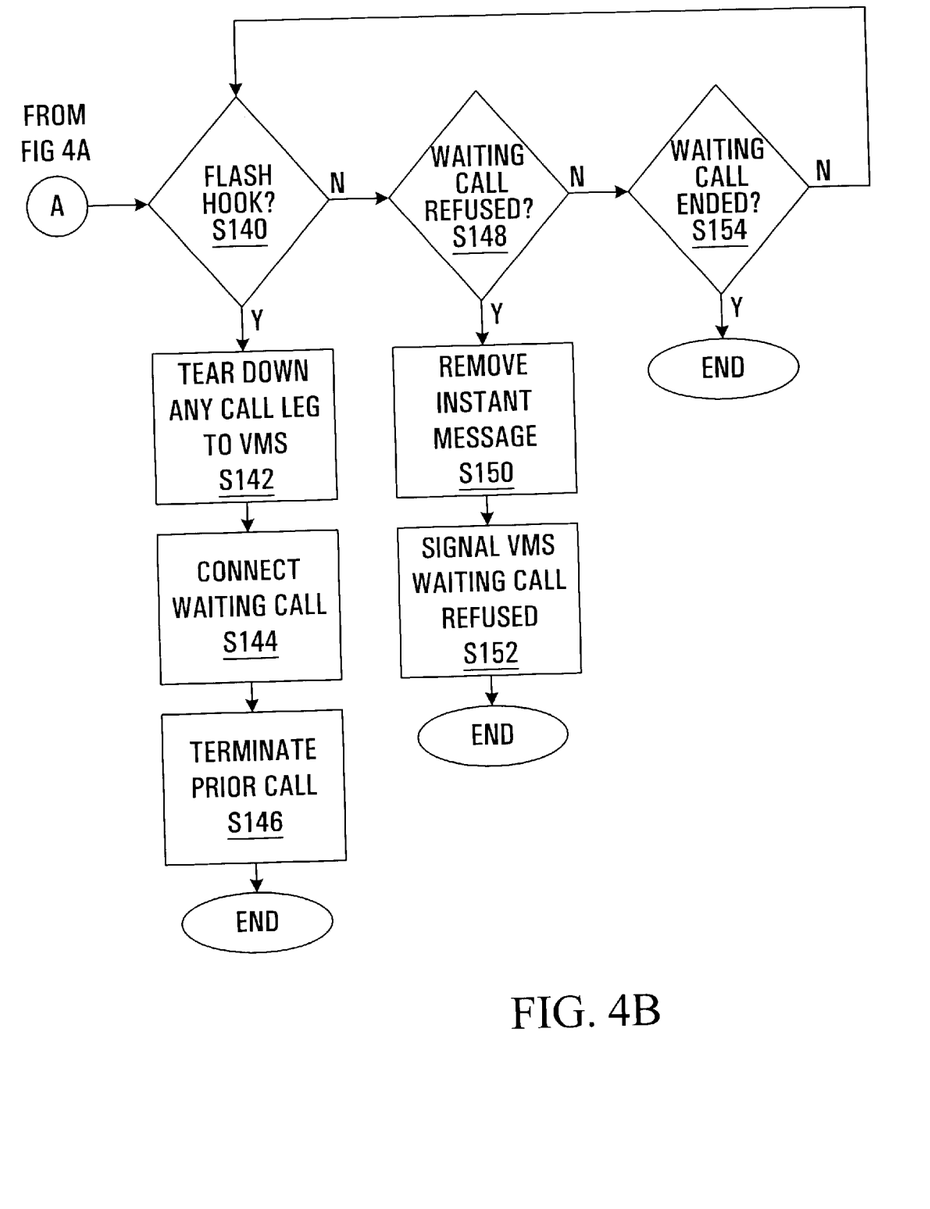

The operation of system 10 is described in conjunction with FIGS. 4A and 4B. On receiving a request to establish a call from, say, telephone station 20 to telephone station 18, operating software 26 of switch 12 may look up a customer record for telephone station 18 in database 34 to determine whether telephone station 18 has an associated personal agent (S110, S112, S114). Assuming no, if telephone station 18 is idle (S116), a call path may be established between telephone station 20 and telephone station 18 in a conventional fashion (S118). The segment of the call path on communication line 18*a* between switch 12 and station 18 has an outbound path from the switch 12 to the station 20 and an inbound path from the station to the switch. After establishment of the call path, a request may be received to establish a call from, say, telephone station 21 to telephone station 18 (S110, S112). After determining telephone station 18 has no personal agent (S114), the switch notes that station 18 is busy with another call (S118). The customer record for station 18 is then reviewed to determine whether the station subscribes to voice mail (S122). If no, a busy signal is simply fed back to station 21 (S124). If yes, then the switch connects the new call to VMS 16 (S126).

Figure 5:
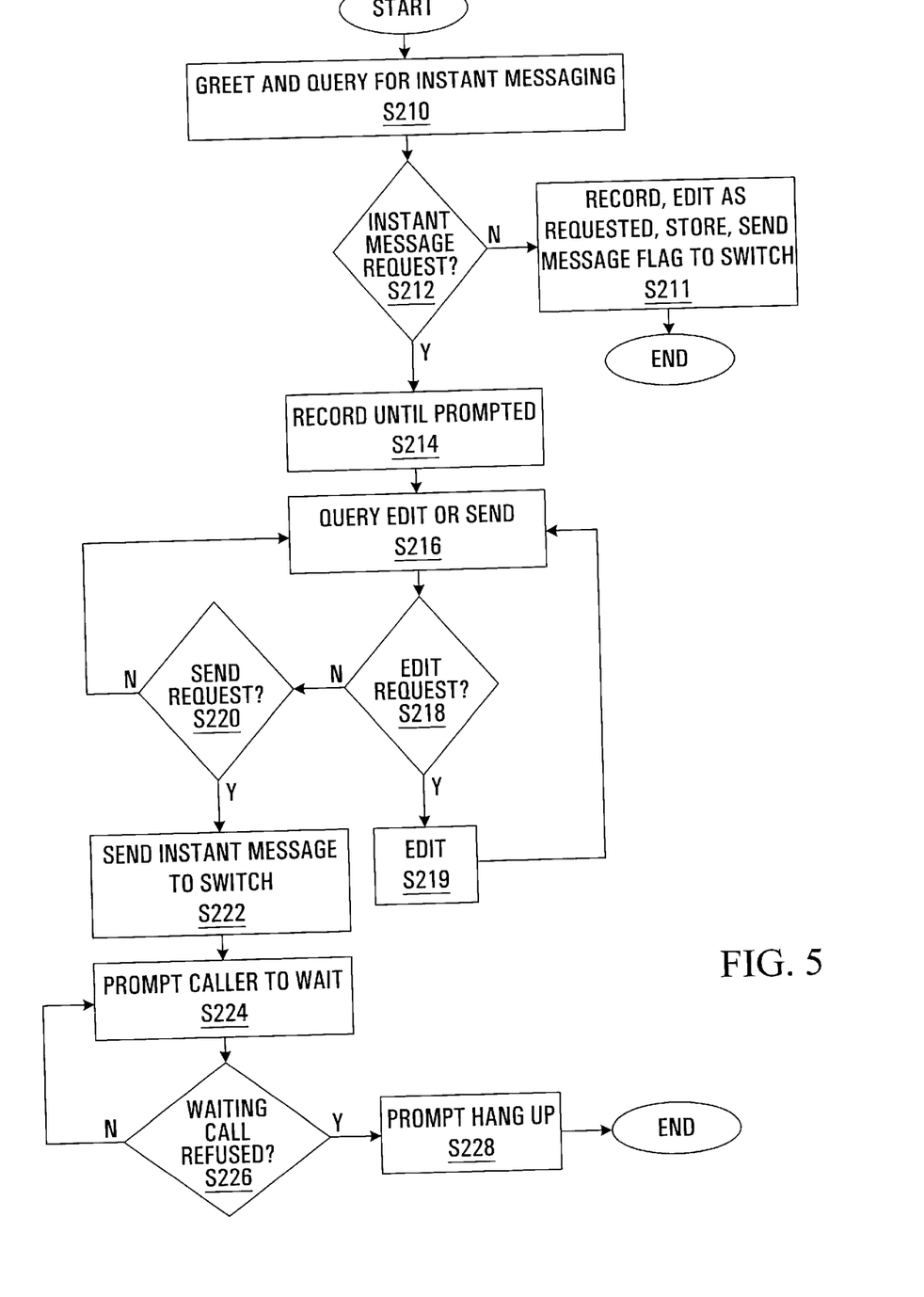

Turning to FIG. 5, responsive to receiving the new call, VMS 16 accesses a greeting from database 46 and plays same (S210). The greeting indicates station 18 is busy and queries whether the caller wishes to leave a message and hang up or, instead, deliver a message and wait on the line (sometimes referred to hereinafter as "instant messaging"). If station 21 chooses to simply leave a message, it is recorded and stored in a conventional fashion and the VMS sends a messaging waiting flag to switch 12 (S211). If station 21 chooses the option of delivering a message and waiting on the line (S212), then, in a conventional fashion, the VMS generates a beep tone and records input from station 21 until receiving an end of recording indication from the caller (S214). After recording a message, the VMS gives the caller at station 21 an opportunity to edit same (S216, S218, S219). Once station 21 requests delivery of the message (S220), the VMS sends the instant message to switch 12 (S222). The VMS then accesses database 46 for a prompt which is periodically played to station 21 to indicate the recorded message is being delivered and that the caller should stay on the line (S224). The caller may deliver her choice amongst options, edit commands, an end of recording indication, and other control information to VMS 16 by appropriate DTMF entries at station 21 which are interpreted by DTMF module 44 or by a voice commands which are interpreted by IVR module 42.

Returning to FIGS. 4A and 4B, switch 12, on receipt of an instant message from VMS 16 (S132), attenuates the amplitude of the recorded message by between 3 dB and 9 dB (S134) and superimposes the recorded message on the outbound path of communication line 18*a*, while avoiding superposition of the recorded message on the inbound path (S136). Voice signals in switch 12 are typically digital, either by virtue of arriving in digital form or by virtue of being converted to digital signals after arriving. In consequence, superposition may be accomplished by a summing circuit which sums the digital recorded message with digitised speech from station 20. Additionally, avoiding transmission of the recorded message to station 20 may be accomplished by a difference circuit which acts as an echo canceller. Alternatively, the inbound path of communications line 18*a* may be muted during delivery of the message. A suitable system for selectively superposing digitised speech signals is described in U.S. Pat. No. 5,034,947, the contents of which are incorporated herein by reference. In consequence, the called party may hear the recorded message while continuing to hear any speech from the caller at station 20. Due to its attenuation, the message will have a lower average volume than that of speech from station 20 so that the called party may more easily distinguish between the superposed signals. Indeed, the message may be attenuated sufficiently that it is heard as a whisper. Additionally, the message will not be heard at station 21.

If, based on the recorded message, the called party decides to take the waiting call, she may generate a flash hook signal (S140). In such case, switch 12 tears down the call leg from the switch to the VMS in respect of the waiting call from station 21 (S142) and connects the waiting call through the switch to station 18 (S144). The switch also tears down the call leg from the switch to station 18 in respect of the prior call from station 20 such that the prior call is terminated (S146). Alternatively, the called party can key in a DTMF code (e.g., press the number "1") to indicate to the switch 12 that it does not wish to take the waiting call (S148) whereupon the switch will immediately remove the superposed signal from the outbound path of communication line 18*a* (S150). Further, in such instance, the switch will signal the VMS to indicate that the call from telephone 21 will not be completed (S152). Referencing FIG. 5, in response, the VMS will play a message to station 21 indicating that the call will not be completed and that the caller may now hang up (S226, S228). The switch continues to await either a flash hook or a refusal of the waiting call until receiving a hang up signal in respect of the waiting call (S154).

When a call first arrives at the VMS, optionally, the VMS may also indicate an option to have an instant message delivered in real time rather than be recorded, edited, then sent. In such case, if the caller requests this service, the VMS sends an appropriate prompt to the switch and establishes a call path to the switch for the ensuing message. The VMS 16 then generates a beep tone to prompt the caller to begin the message. In one embodiment, the VMS may record the message as well as port it through to switch 12 as it is received. On receipt of such a prompt, the switch 12 attenuates and superposes the real-time message on the outbound path of communication line 18*a*. Again, the called party, in response, may switch to the new call, refuse the new call, or take no action one way or the other.

If the called party does have a personal agent 28 (S114), then each new call for the called party is directed by the switch 12 to this agent (S160) whether or not the called party is busy with a call. When a new call arrives in a call busy situation, the personal agent interacts with the caller to obtain information about the call. In a conventional fashion, this interaction may involve speech synthesized or recorded speech prompts to the caller and DTMF or voice responses from the caller. In one embodiment, switch 12 may superpose this interaction on the outbound path of communication line 18*a*, after attenuation so that the called party may listen in on the interaction (S162). In another embodiment, after the completion of the interaction, the personal agent may prompt the caller to remain on the line. The assistant may then send information (such as the caller's name, a short message, and an indication of priority) as recorded from the caller, or as speech synthesized, to the switch 12. In response, the switch superposes the information on the communication line 18a after its attenuation. As with a VMS connection, in response to the instant message, the called party may take the waiting call, refuse the waiting call, or take no action.

In a further embodiment, even absent any personal agent or VMS, special purpose software for providing the instant messaging call feature may reside on switch 12 as part of operating software 26.

If the called party's telephone station is equipped with a display 22, then text messages may be sent to the display using a suitable protocol such as the Analog Display Services Interface (ADSI). Where system 10 is so provisioned, the instant message obtained (by VMS 16, personal agent 28, or operating software) may be sent as text (being translated from speech, if necessary) to called station 21 for display.

If network 14 includes the Internet and a computer 23 is connected to the switch 12 as a telephone station, then an instant message which is text based may be sent to the computer for display while the computer is engaged on a data call or a voice over Internet Protocol (VoIP) call.

If, based on a customer record for the called party at switch 12, switch 12 knows the called station 18 has an associated pager or other text-based telephone appliance, the switch may send the text based instant message to this other telephone appliance either instead of, or in addition to, sending an instant message to called station 18.

Where the called party receives a text based instant message on a computer 23 or a text based telephone appliance, the called party may be able to respond to the instant message with a text reply while continuing with the earlier call. In such instance, if the caller has a text display, the reply may be displayed thereon. Otherwise, the reply may be converted to speech and played to the caller.

Figure 6:
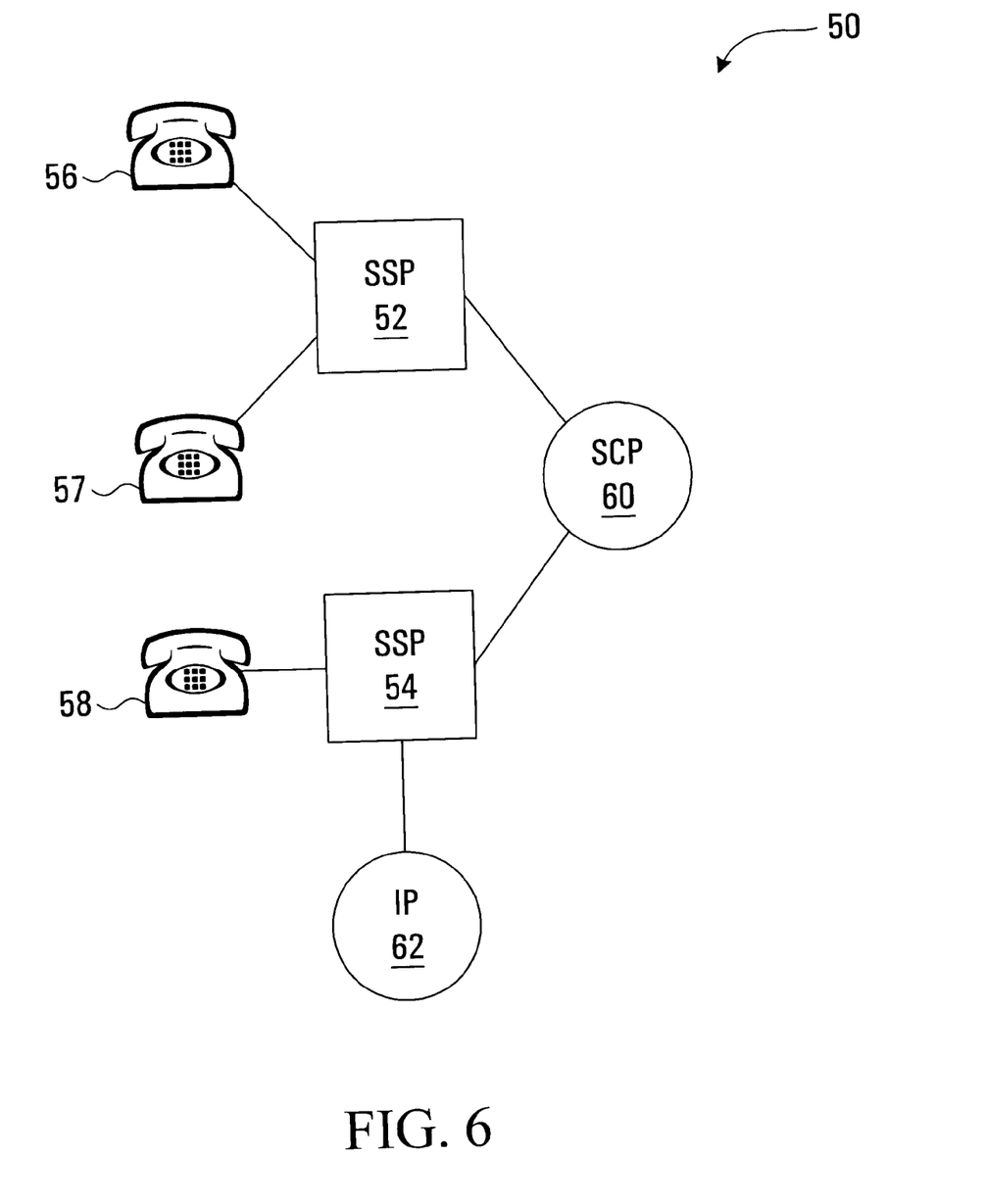
FIG. 6 is a block diagram of another system made in accordance with this invention.

An advanced intelligent network (AIN) architecture in which this invention may be used is shown in FIG. 6. AIN 50 has service switching points (SSPs) 52, 54, each with associated telephone stations 56, 57, 58. The SSPs connect to a service control point (SCP) 60. SSP 54 is shown connected to an intelligent peripheral (EP) 62.

In operation, if a call arrives for telephone station 58 while it is busy with another call, SSP 54 directs a call handling query to SCP 60. SCP may look up a data record for the called party and, in response, send call handling instructions to the SSP. These may enable the SSP to provide the instant messaging described hereinbefore. Alternatively, these call handling instructions may direct the SSP to complete the new call to IP 62. EP 62 may then function in conjunction with SSP 54 in a similar manner to that described for the operation of switch 12 (FIG. 1) in conjunction with VMS 16.

By virtue of the caller requesting instant messaging, the caller is aware of the process and so will be more likely to provide an instant message appropriate to the circumstance of the called party being busy with another call. The caller will also be aware of the need to stay on the line in case the called party switches to her call.

Communications systems 10 (of FIG. 1) and 50 (of FIG. 6) have been illustrated with communication lines to the stations 18, 19, 21, 23 and 56, 57, 58, respectively. More generally, the communication lines are communication links which may be land lines or wireless links.

The call waiting message superimposed on the call path has been described as having a lower average volume than the average volume of speech of the existing call. However, equally the average volume of the message may be greater than the average volume of speech of the existing call since in such instance the called party could still distinguish between the message and speech from the existing call.

Other modifications will be apparent to those skilled in the art and, therefore, the invention is defined in the claims.

What is claimed is:

1. A method for voice call management comprising, where a communications link terminated by a first station is busy with a call and a new call is waiting for said first station, responsive to a request from a calling station for said new call, determining whether said calling station desires to (i) record a message for said called station and disconnect or (ii) engage in instant messaging, and if determined to engage in instant messaging, then receiving a message from said calling station and providing the message on said call busy communications link based on input from said calling station, said message comprising speech indications superimposed on a path of said communications link outbound to said first station and not superimposed on a path of said communications link inbound from said first station.

2. The method of claim 1 wherein said speech indications relating to said waiting call have an average volume different than an average volume of speech indications of an existing call on said communication link.

3. The method of claim 1 farther comprising:
on receipt of said new call, prompting for said message.

4. The method of claim 3 wherein said message is recorded and said recording is superimposed on said outbound path.

5. The method of claim 4 wherein a signal level of said recording is attenuated by between 3 dB to 9 dB prior to being superimposed on said outbound path.

6. The method of claim 4 further comprising permitting editing of said recording based on input from said calling station prior to superimposing said recording on said outbound path.

7. The method of claim 4 further comprising providing message delivery indications to said calling station while superimposing said recording on said outbound path.

8. The method of claim 3 wherein said message is superimposed on said outbound path while said input from said calling station is received.

9. The method of claim 3 wherein said message is simultaneously recorded as it is superimposed on said outbound path in real time.

10. The method of claim 1 wherein said inbound path is muted while said speech indications are superimposed on said outbound path.

11. The method of claim 1 wherein echo cancellation is employed on said inbound path to cancel said whispered speech indications from said inbound path.

12. The method of claim 1 further comprising responsive to said request from said calling station, prompting said calling station for information; synthesizing speech indications based on any said information received; and wherein said synthesized speech indications are said superimposed speech indications.

13. A method for facilitating voice call management, comprising:
while a call path terminated with a first station is busy with a call, on receipt of another call for said first station from a calling station, querying whether said calling station desires to (i) record a message for said first station and disconnect or (ii) engage in instant messaging, and in response to an indication from said calling station to engage in instant messaging, then receiving speech indications from said calling station and superimposing on any signal on a path of said call path outbound to said first station, speech indications related to said another call at a volume normally associated with a whisper.

14. Apparatus for facilitating voice call management, comprising:

means for, where a communications link terminated by a first station is busy with a call and a new call is waiting for said first station, receiving input from a calling station for said new call;

means for, responsive to said input, determining whether said calling station desires to (i) record a message for said called station and disconnect or (ii) engage in instant messaging, and if determined to engage in instant messaging, then receiving a message from said calling station and providing the message on said call busy communications link based on input from said calling station, said message comprising speech indications superimposed on a path of said communications link outbound to said first station and not superimposed on a path of said communications link inbound from said first station.

15. A personal agent adapted to:

where a communications link terminated by a first station is busy with a call and a new call is waiting for said fist station, responsive to a request from a calling station for said new call, determine whether said calling station desires to (i) record a message for said called station and disconnect or (ii) engage in instant messaging, and if determined to engage in instant messaging, then receive a message from said calling station and provide the message on said call busy communications link based on input from said calling station, said message comprising speech indications superimposed on a path of said communications link outbound to said first station and not superimposed on a path of said communications link inbound from said first station.

16. A voice mail system adapted to:

where a communications link terminated by a first station is busy with a call and a new call is waiting for said first station, responsive to a request from a calling station for said new call, determine whether said calling station desires to (i) record a message for said called station and disconnect or (ii) engage in instant messaging, and if determined to engage in instant messaging, then receive a message from said calling station and provide the message on said call busy communications link based on input from said calling station, said message comprising speech indications superimposed on a path of said communications link outbound to said first station and not superimposed on a path of said communications link inbound from said first station.

17. A telephone switch adapted to:

where a communications link terminated by a first station is busy with a call and a new call is waiting for said first station, responsive to a request from a calling station for said new call, determine whether said calling station desires to (i) record a message for said called station and disconnect or (ii) engage in instant messaging, and if determined to engage in instant messaging, then receive a message from said calling station and provide the message on said call busy communications link based on input from said calling station, said message comprising speech indications superimposed on a path of said communications link outbound to said first station and not superimposed on a path of said communications link inbound from said first station.

18. A computer readable medium which, when loaded into a processor of a communications system, adapts said communications system to:

where a communications link terminated by a first station is busy with a call and a new call is waiting for said first station, receive input from a calling station for said new call;

determine whether said calling station desires to (i) record a message for said called station and disconnect or (ii) engage in instant messaging, and if determined to engage in instant messaging, then receive a message from said calling station and provide the message on said call busy communications link based on said input, said message comprising speech indications superimposed on a path of said communications link outbound to said first station and not superimposed on a path of said communications link inbound from said first station.

* * * * *

UNITED STATES PATENT AND TRADEMARK OFFICE
CERTIFICATE OF CORRECTION

PATENT NO. : 6,735,295 B1
DATED : May 11, 2004
INVENTOR(S) : Paul M. Brennan et al.

It is certified that error appears in the above-identified patent and that said Letters Patent is hereby corrected as shown below:

Column 5,
Line 45, delete "(EP)" and insert -- (IP) --.

Column 6,
Line 18, delete "roceiving" and insert -- receiving --.
Line 29, delete "farther" and insert -- further --.

Column 7,
Line 29, delete "fist" and insert -- first --.

Signed and Sealed this

Fourth Day of January, 2005

JON W. DUDAS
*Director of the United States Patent and Trademark Office*